US010552722B2

(12) United States Patent
Finn et al.

(10) Patent No.: US 10,552,722 B2
(45) Date of Patent: Feb. 4, 2020

(54) SMARTCARD WITH COUPLING FRAME ANTENNA

(71) Applicants: David Finn, Tourmakeady (IE); Mustafa Lotya, Celbridge (IE); Darren Molloy, Galway (IE)

(72) Inventors: David Finn, Tourmakeady (IE); Mustafa Lotya, Celbridge (IE); Darren Molloy, Galway (IE)

(73) Assignee: Féinics AmaTech Teoranta, Lower Churchfield, Tourmakeady, County Mayo (IE)

( * ) Notice: Subject to any disclaimer, the term of this patent is extended or adjusted under 35 U.S.C. 154(b) by 0 days.

(21) Appl. No.: 15/939,282

(22) Filed: Mar. 29, 2018

(65) Prior Publication Data

US 2018/0341847 A1   Nov. 29, 2018

Related U.S. Application Data

(63) Continuation-in-part of application No. 15/358,138, filed on Nov. 22, 2016, now Pat. No. 9,960,476,
(Continued)

(51) Int. Cl.
*G06K 19/06* (2006.01)
*G06K 19/077* (2006.01)
(Continued)

(52) U.S. Cl.
CPC . *G06K 19/07754* (2013.01); *G06K 19/07769* (2013.01); *G06K 19/07783* (2013.01);
(Continued)

(58) Field of Classification Search
CPC ....... G06K 19/07754; G06K 19/07769; G06K 19/07783; G06K 19/00794; H01Q 7/00; H01Q 1/2225; H01Q 1/38; H04B 5/0062
(Continued)

(56) References Cited

U.S. PATENT DOCUMENTS

| 5,084,699 A | 1/1992 | DeMichele |
| D341,092 S | 11/1993 | Wild |

(Continued)

FOREIGN PATENT DOCUMENTS

| DE | 19632115 | 12/1997 |
| EP | 0782214 | 7/1997 |

(Continued)

OTHER PUBLICATIONS

International Search Report and Written Opinion from related PCT/EP2018/058251 filed Mar. 29, 2018.
(Continued)

*Primary Examiner* — Karl D Frech
(74) *Attorney, Agent, or Firm* — Gerald E. Linden

(57) ABSTRACT

Smartcard (SC) having a card body (CB) and a conductive coupling frame antenna (CFA) extending as a closed loop circuit around a periphery of the card body, and also extending inwardly so that two portions of the coupling frame antenna are closely adjacent each other, with a gap therebetween. The gap may extend from a periphery of the card body to a position corresponding with a module antenna (MA) of a transponder chip module (TCM) disposed in the card body, and may function like a slit (S) in a coupling frame (CF). A portion of the coupling frame antenna may be arranged to surround the ISO position of the transponder chip module in the card body. A coupling frame antenna (CFA) may be incorporated onto a module tape (MT) for a transponder chip module (TCM).

20 Claims, 3 Drawing Sheets

Related U.S. Application Data which is a continuation-in-part of application No. 15/331,821, filed on Oct. 22, 2016, now abandoned, which is a continuation-in-part of application No. 15/072,356, filed on Mar. 17, 2016, now Pat. No. 9,836,684, which is a continuation-in-part of application No. 14/862,119, filed on Sep. 22, 2015, now Pat. No. 9,697,459, which is a continuation-in-part of application No. 15/197,795, filed on Jun. 30, 2016, now Pat. No. 9,812,782, which is a continuation-in-part of application No. 14/551,376, filed on Nov. 24, 2014, now Pat. No. 9,390,364, which is a continuation-in-part of application No. 14/619,170, filed on Feb. 11, 2015, now Pat. No. 9,634,391, which is a continuation-in-part of application No. 14/492,113, filed on Sep. 22, 2014, now Pat. No. 9,798,968, which is a continuation-in-part of application No. 14/465,815, filed on Aug. 21, 2014, now Pat. No. 9,475,086, which is a continuation-in-part of application No. 15/818,785, filed on Nov. 21, 2017, now abandoned.

(60) Provisional application No. 62/478,589, filed on Mar. 29, 2017, provisional application No. 62/371,768, filed on Aug. 7, 2016, provisional application No. 62/300,906, filed on Feb. 28, 2016, provisional application No. 62/289,189, filed on Jan. 30, 2016, provisional application No. 62/281,209, filed on Jan. 21, 2016, provisional application No. 62/258,531, filed on Nov. 22, 2015, provisional application No. 62/246,685, filed on Oct. 27, 2015, provisional application No. 62/204,466, filed on Aug. 13, 2015, provisional application No. 62/201,578, filed on Aug. 6, 2015, provisional application No. 62/175,308, filed on Jun. 14, 2015, provisional application No. 62/163,962, filed on May 19, 2015, provisional application No. 62/150,307, filed on Apr. 21, 2015, provisional application No. 62/136,644, filed on Mar. 23, 2015, provisional application No. 62/102,103, filed on Jan. 12, 2015, provisional application No. 62/088,598, filed on Dec. 7, 2014, provisional application No. 62/080,332, filed on Nov. 16, 2014, provisional application No. 62/061,689, filed on Oct. 8, 2014, provisional application No. 62/044,394, filed on Sep. 1, 2014, provisional application No. 62/039,562, filed on Aug. 20, 2014, provisional application No. 62/035,430, filed on Aug. 10, 2014.

(51) Int. Cl.
*H04B 5/00* (2006.01)
*H01Q 1/22* (2006.01)
*H01Q 7/00* (2006.01)
*H01Q 1/38* (2006.01)

(52) U.S. Cl.
CPC ............ *H01Q 1/2225* (2013.01); *H01Q 7/00* (2013.01); *H04B 5/0062* (2013.01); *G06K 19/07794* (2013.01); *H01Q 1/38* (2013.01)

(58) Field of Classification Search
USPC .................................................. 235/492, 487
See application file for complete search history.

(56) References Cited

U.S. PATENT DOCUMENTS

| | | |
|---|---|---|
| 5,281,855 A | 1/1994 | Hadden et al. |
| 5,581,065 A | 12/1996 | Nishikawa et al. |
| D378,064 S | 2/1997 | Wild |
| D404,319 S | 1/1999 | Deleskiewicz |
| 5,955,723 A | 9/1999 | Reiner |
| 5,982,624 A | 11/1999 | Onoda et al. |
| 6,018,299 A | 1/2000 | Eberhardt |
| D423,374 S | 4/2000 | Deleskiewicz |
| 6,107,920 A | 8/2000 | Eberhardt et al. |
| 6,147,605 A | 11/2000 | Vega et al. |
| 6,190,942 B1 | 2/2001 | Wilm et al. |
| 6,233,818 B1 | 5/2001 | Finn et al. |
| 6,265,977 B1 | 7/2001 | Vega et al. |
| 6,378,774 B1 | 4/2002 | Emori |
| 6,452,563 B1 | 9/2002 | Porte |
| 6,581,839 B1 | 6/2003 | Lasch et al. |
| 6,611,199 B1 | 8/2003 | Geiszler et al. |
| 6,634,564 B2 | 10/2003 | Kuramochi |
| 6,698,089 B2 | 3/2004 | Finn et al. |
| 6,749,123 B2 | 6/2004 | Lasch et al. |
| 6,764,014 B2 | 7/2004 | Lasch et al. |
| 6,986,465 B2 | 1/2006 | Kiekhaefer |
| 7,183,987 B2 | 2/2007 | Akiho et al. |
| 7,306,158 B2 | 12/2007 | Berardi et al. |
| 7,377,443 B2 | 5/2008 | Lasch et al. |
| 7,440,771 B2 | 10/2008 | Purk |
| 7,494,057 B2 | 2/2009 | Lasch et al. |
| 7,530,491 B2 | 5/2009 | Lasch et al. |
| 7,588,184 B2 | 9/2009 | Gandel et al. |
| 7,607,583 B2 | 10/2009 | Berardi et al. |
| 7,701,350 B2 | 4/2010 | Sakama et al. |
| 7,721,956 B2 | 5/2010 | Williams et al. |
| 7,757,957 B2 | 7/2010 | Cranston et al. |
| 7,819,310 B2 | 10/2010 | Lasch et al. |
| 7,823,777 B2 | 11/2010 | Varga et al. |
| 7,837,116 B2 | 11/2010 | Morril Webb et al. |
| 7,934,646 B2 | 5/2011 | Yang |
| 8,033,457 B2 | 10/2011 | Varga et al. |
| 8,066,190 B2 | 11/2011 | Faenza, Jr. |
| 8,079,514 B2 | 12/2011 | Lasch et al. |
| 8,100,337 B2 | 1/2012 | Artigue et al. |
| 8,130,166 B2 | 3/2012 | Ayala et al. |
| 8,141,787 B2 | 3/2012 | Savry |
| 8,186,582 B2 | 5/2012 | Varga et al. |
| 8,186,598 B2 | 5/2012 | Faenza, Jr. |
| 8,191,788 B2 | 6/2012 | Morrill-Webb et al. |
| 8,261,997 B2 | 9/2012 | Gebhart |
| 8,360,312 B2 | 1/2013 | Varga et al. |
| 8,366,009 B2 | 2/2013 | Finn et al. |
| 8,378,911 B2 | 2/2013 | Eray et al. |
| 8,393,547 B2 | 3/2013 | Keikhafer et al. |
| 8,474,726 B2 | 7/2013 | Finn |
| 8,523,062 B2 | 9/2013 | Varga et al. |
| D693,264 S | 11/2013 | Rabassa |
| 8,608,080 B2 | 12/2013 | Finn |
| 8,608,082 B2 | 12/2013 | Le Garrec et al. |
| 8,672,232 B2 | 3/2014 | Herslow |
| 8,789,762 B2 | 7/2014 | Finn et al. |
| 8,891,712 B2 | 11/2014 | Sugiyama et al. |
| D729,074 S | 5/2015 | Boulangeot |
| 8,976,075 B2 | 5/2015 | Kato et al. |
| 9,033,250 B2 | 5/2015 | Finn et al. |
| 9,112,272 B2 | 8/2015 | Finn et al. |
| 9,165,240 B2 | 10/2015 | Finn et al. |
| 9,195,932 B2 | 11/2015 | Finn et al. |
| 9,203,157 B2 | 12/2015 | Kato et al. |
| 9,272,370 B2 | 3/2016 | Finn et al. |
| 9,390,364 B2 | 7/2016 | Finn et al. |
| 9,449,269 B2 | 9/2016 | Finn et al. |
| 9,475,086 B2 | 10/2016 | Finn et al. |
| 9,489,613 B2 | 11/2016 | Finn et al. |
| 9,564,678 B2 | 2/2017 | Kato et al. |
| 9,633,304 B2 | 4/2017 | Finn et al. |
| 9,697,459 B2 | 7/2017 | Finn et al. |
| 9,721,200 B2 | 8/2017 | Herslow et al. |
| 9,798,968 B2 | 10/2017 | Finn et al. |
| 9,812,782 B2 | 11/2017 | Finn et al. |
| 9,836,684 B2 | 12/2017 | Finn et al. |
| 9,960,476 B2 * | 5/2018 | Finn ............... H01Q 1/2225 |
| 2003/0057288 A1 | 3/2003 | Salzgeber |
| 2004/0069856 A1 | 4/2004 | Held et al. |

(56) References Cited

U.S. PATENT DOCUMENTS

| | | |
|---|---|---|
| 2006/0243811 A1 | 11/2006 | Koyama et al. |
| 2007/0164414 A1 | 7/2007 | Dokai et al. |
| 2009/0152362 A1 | 6/2009 | Ayala et al. |
| 2009/0169776 A1 | 7/2009 | Herslow |
| 2009/0315320 A1 | 12/2009 | Finn |
| 2011/0023289 A1 | 2/2011 | Finn |
| 2011/0063184 A1 | 3/2011 | Furumura et al. |
| 2011/0090058 A1 | 4/2011 | Ikemoto |
| 2011/0163167 A1 | 7/2011 | Artigue et al. |
| 2011/0181486 A1 | 7/2011 | Kato |
| 2011/0186641 A1 | 8/2011 | Kato et al. |
| 2011/0189620 A1 | 8/2011 | Herslow |
| 2012/0018522 A1 | 1/2012 | Le Garrec et al. |
| 2013/0075477 A1 | 3/2013 | Finn et al. |
| 2013/0126622 A1 | 5/2013 | Finn |
| 2013/0146670 A1 | 6/2013 | Grieshofer et al. |
| 2013/0146671 A1 | 6/2013 | Grieshofer et al. |
| 2014/0166762 A1 | 6/2014 | Herslow |
| 2014/0263655 A1 | 9/2014 | Forster |
| 2015/0097040 A1 | 4/2015 | Rampetzreiter et al. |
| 2015/0136858 A1 | 5/2015 | Finn et al. |
| 2015/0269474 A1 | 9/2015 | Finn et al. |
| 2016/0110639 A1 | 4/2016 | Finn et al. |
| 2018/0123221 A1 | 5/2018 | Finn et al. |
| 2018/0339503 A1 | 11/2018 | Finn et al. |
| 2018/0341846 A1 | 11/2018 | Finn et al. |
| 2018/0341847 A1 | 11/2018 | Finn et al. |

FOREIGN PATENT DOCUMENTS

| | | |
|---|---|---|
| EP | 1031939 | 8/2000 |
| EP | 1158601 | 11/2001 |
| EP | 2063489 | 5/2009 |
| EP | 1854222 | 6/2012 |
| EP | 2525304 | 11/2012 |
| EP | 2541471 | 2/2013 |
| EP | 2372840 | 9/2013 |
| JP | 11025244 | 1/1999 |
| JP | 11238103 | 8/1999 |
| JP | 2002344225 | 11/2002 |
| JP | 2005204038 | 7/2005 |
| WO | WO 2008081224 | 7/2008 |
| WO | WO 2013034426 | 3/2013 |
| WO | WO 2013110625 | 8/2013 |
| WO | WO 2014016332 | 1/2014 |
| WO | WO 2017198842 | 11/2017 |

OTHER PUBLICATIONS

Use of Slits of Defined Width in Metal Layers Within ID-1 Cards, as Reactive Couplers for Nearfield Passive RFID at 13.56 MHz; Ackland, Lotya, Finn, and Stamenov; 2016 IEEE International Conference on RFID (RFID); 978-1-4673-8807-8/16/$31.00 © 2016 IEEE; 4 pages.

Ackland, K., Lotya, M., Finn, D.J. and Stamenov, P. (2016). "Use of slits of defined width in metal layers within ID-1 cards, as reactive couplers for near-field passive RFID at 13.56 MHz", 2016 IEEE International Conference on RFID (RFID), Orlando, FL, pp. 1-4.

Qing, X. and Chen, Z.N. (2007). "Proximity Effects of Metallic Environments on High Frequency RFID Reader Antenna: Study and Applications", IEEE Transactions on Antennas and Propagation, vol. 55 (11): pp. 3105-3111.

Chen, S.L., Kuo, S.K. and Lin C.T. (2009). "A metallic RFID tag design for steel-bar and wire-rod management application in the steel industry", Progress in Electromagnetics Research, PIER vol. 91: pp. 195-212.

Mukherjee, S. (2014). "Mitigation of proximity to metal for magnetically coupled transponders by use of resonant loops", 2014 IEEE International Conference on RFID (IEEE RFID), Orlando, FL, pp. 8-14.

\* cited by examiner

Dual Interface (DI) Smart Card, and Readers

SMARTCARD WITH COUPLING FRAME ANTENNA

CROSS-REFERENCES TO RELATED APPLICATIONS

Priority (filing date benefit) is claimed from the following:
This is a non-provisional of U.S. 62/478,589 filed 29 Mar. 2017
This is a continuation-in-part of U.S. Ser. No. 15/358,138 filed 22 Nov. 2016 (US 20170077589, 16 Mar. 2017), which claims benefit/priority of/from:
  a nonprovisional of U.S. 62/258,531 filed 22 Nov. 2015
  a nonprovisional of U.S. 62/371,768 filed 7 Aug. 2016
U.S. Ser. No. 15/358,138 is a continuation-in-part of U.S. Ser. No. 15/331,821 filed 22 Oct. 2016, which claims benefit/priority of/from:
  U.S. 62/246,685 filed 27 Oct. 2015
U.S. Ser. No. 15/358,138 is a continuation-in-part of U.S. Ser. No. 15/072,356 filed 17 Mar. 2016 (U.S. Pat. No. 9,836,684, 5 Dec. 2017, which claims benefit/priority of/from:
  U.S. 62/300,906 filed 28 Feb. 2016
  U.S. 62/289,189 filed 30 Jan. 2016
  U.S. 62/281,209 filed 21 Jan. 2016
U.S. Ser. No. 15/358,138 is a continuation-in-part of U.S. Ser. No. 14/862,119 filed 22 Sep. 2015 (U.S. Pat. No. 9,697,459 4 Jul. 2017, which claims benefit/priority of/from:
  U.S. 62/136,644 filed 23 Mar. 2015
  U.S. 62/150,307 filed 21 Apr. 2015
  U.S. 62/163,962 filed 19 May 2015
  U.S. 62/175,308 filed 14 Jun. 2015
  U.S. 62/201,578 filed 6 Aug. 2015
  U.S. 62/204,466 filed 13 Aug. 2015
U.S. Ser. No. 15/358,138 is a continuation-in part of U.S. Ser. No. 15/197,795 filed 30 Jun. 2016 (U.S. Pat. No. 9,812,782, 7 Nov. 2017), which is a continuation-in-part of U.S. Ser. No. 14/551,376 filed 24 Nov. 2014 (US 20150136858, 21 May 2015; U.S. Pat. No. 9,390,364, 12 Jul. 2016), which claims benefit/priority of/from:
  U.S. 62/044,394 filed 1 Sep. 2014
  U.S. 62/061,689 filed 8 Oct. 2014
  U.S. 62/080,332 filed 16 Nov. 2014
U.S. Ser. No. 15/358,138 is a continuation-in-part of U.S. Ser. No. 14/619,170 filed 11 Feb. 2015 (U.S. Pat. No. 9,634,391, 25 Apr. 2017), which claims benefit/priority of/from:
  U.S. 62/102,103 filed 12 Jan. 2015
  U.S. 62/088,598 filed 7 Dec. 2014
U.S. Ser. No. 15/358,138 is a continuation-in-part of U.S. Ser. No. 14/492,113 filed 22 Sep. 2014 (U.S. Pat. No. 9,798,968 24 Oct. 2017), which is a continuation-in-part of U.S. Ser. No. 14/465,815 filed 21 Aug. 2014 (U.S. Pat. No. 9,475,086, 25 Oct. 2016), which claims benefit/priority of/from:
  U.S. 62/039,562 filed 20 Aug. 2014
  U.S. 62/035,430 filed 10 Aug. 2014
This is also a continuation-in-part of U.S. Ser. No. 15/818,785 filed 21 Nov. 2017

TECHNICAL FIELD

This disclosure relates to smartcards (or payment cards, secure documents, access control cards, electronic tickets, small form factor tags, data carriers, mobile payment devices and the like), operating at least in a contactless mode (ISO 14443 and NFC/ISO 15693). The smartcard (or smart card) may comprise a card body (CB) made of plastic or metal or a combination thereof, and a transponder chip module (TCM) comprising a dual interface RFID chip and a module antenna (MA).

BACKGROUND

A dual interface (DI or DIF) smartcard (or smart card; SC) may generally comprise:
  an antenna module (AM), or transponder chip module (TCM), or RFID module,
  a card body (CB) having layers of plastic or metal, or combinations thereof, and
  a booster antenna (BA).

The antenna module "AM" may generally comprise a "DI" RFID chip (bare, unpackaged silicon die) or chip module (a die with leadframe, interposer, carrier or the like)—either of which may be referred to as "CM"— mounted to a module tape "MT". The RFID chip (CM) may be mounted on a module tape (MT), typically having 6 or 8 contact pads (CP) for interfacing with a contact reader in a contact mode (ISO 7816).

A module antenna "MA" may be disposed on the module tape MT for implementing a contactless interface, such as ISO 14443 and NFC/ISO 15693. Contact pads "CP" may be disposed on the module tape MT for implementing a contact interface, such as ISO 7816. The contact pads (CP) may or may not be perforated. The module tape MT may comprise a pattern of interconnects (conductive traces and pads) to which the RFID chip CM and contact pads CP may be connected.

The module antenna MA may be connected, indirectly, via some of the interconnects to the chip CM, or may be directly connected to bond pads BP on the RFID chip CM. The module antenna MA may comprise several turns of wire, such as 112 micron diameter insulated wire. Reference may be made to U.S. Pat. No. 6,378,774 (2002, Toppan), for example FIG. 12A, B thereof. Alternatively, the module antenna (MA) may comprise a chemically-etched, planar module antenna MA with planar tracks surrounding the chip (CM). Reference may be made to U.S. Pat. No. 8,100,337 (2012, SPS), for example FIG. 3 thereof.

The antenna module "AM" may comprise a module antenna (MA) which may comprise a planar antenna structure (AS) which is etched (chemically etched or laser etched, from a foil on the module tape MT) to have a number of tracks separated by spaces. Generally, with laser etching, the spacing between tracks can be made smaller (such as 25 µm) than with chemical etching (such as 80 or 100 µm).

The module antenna (MA) may comprise multilayered planar antenna structures each connected in a clockwise or anticlockwise direction, or a combination thereof. The module antenna (MA) may also be connected to a silicon capacitor in series or parallel to regulate the tuning of the resonant circuit.

A module antenna (MA) connected to an RFID chip (CM) may be referred to as a "transponder". Generally, such a transponder is a "passive" transponder which does not have its own power source (e.g., battery), but rather which harvests power from an external reader (interrogator).

The activation distance of an antenna module (AM) having a chemically-etched module antenna (MA), without a booster antenna (BA) in the card body (CB), may be only a few millimeters. The activation distance of an antenna module (AM) having a laser-etched antenna structure (LES), without a booster antenna (BA) in the card body (CB) may be 15-20 mm. The activation distance of antenna module (AM) with a booster antenna (BA) in the card body (CB) is typically four centimeters to meet ISO and EMV standards. The addition of a silicon capacitor connected in parallel or series may enhance performance.

Activation and read/write distances of at least a few centimeters (cm) are desirable. However, conventional antenna modules (AM) may require a booster antenna (BA) in a card body (CB) to achieve these distances. As disclosed herein, antenna modules (AM) incorporating a laser-etched antenna structure (LES) may be able to operate without a booster antenna (BA) in the card body (CB), and may be referred to as transponder chip modules (TCM). The transponder chip module (TCM) may be referred to as a transponder IC module.

The antenna module AM (or transponder chip module TCM) may be generally rectangular, having four sides, and measuring approximately 8 mm×11 mm for a 6 contact module and 11 mm×13 mm for an 8 contact module. Alternatively, transponder chip module (TCM) may be round, elliptical, or other non-rectangular shape. When operating in a contactless mode, the transponder chip module (TCM) may be powered by RF from an external RFID reader, and may also communicate by RF with the external RFID reader. An "activation distance" may refer to a distance at which the transponder chip module TCM may harvest sufficient energy from the RFID reader to commence operation. Similarly, a "read/write distance" may refer to a distance at which the transponder chip module TCM may communicate reliably with the external RFID reader.

The card body CB—which may be referred to as a substrate, or an inlay substrate—may generally comprise one or more layers of material such as Polyvinyl Chloride (PVC), Polycarbonate (PC), PET-G (Polyethylene Terephtalate Glycol-modified), Copolyester, Teslin™, synthetic paper, paper and the like.

The card body CB may be generally rectangular, measuring approximately 54 mm×86 mm (refer to ISO/IEC 7810), having a thickness of approximately 300 µm thick when referred to as an inlay substrate or 760 µm when referred to as a smartcard. The card body CB is typically significantly (such as 30 times) larger than the antenna module AM.

The booster antenna BA may generally comprise a relatively large winding which may be referred to as a card antenna CA component (or portion) having a number of turns disposed in a peripheral area of the card body CB, and a relatively small coupler coil (or coupler antenna) CC component (or portion) having a number of turns disposed at a coupling area of the card body CB corresponding to the location of the antenna module AM.

The card antenna CA and coupler coil CC may comprise wire mounted to (embedded in) the card body CB using an ultrasonic tool comprising a sonotrode and a capillary. See, for example U.S. Pat. Nos. 6,698,089 and 6,233,818. The wire may be non-insulated, insulated, or self-bonding wire, having an exemplary diameter in the range of approximately 50-112 µm. Some examples of smartcards (SC) with booster antennas (BA) may be found in . . .
  U.S. Pat. No. 8,474,726 issued 2 Jul. 2013
  U.S. Pat. No. 8,366,009 issued 5 Feb. 2013
  U.S. Pat. No. 9,033,250 issued 15 May 2015

Metallized smartcards may have a faceplate or layer of metal extending over nearly the entire area of the card (except for an opening for the antenna module (AM)), and some smartcards may be made largely of metal. The presence of such a metal layer or mass in the smartcard may tend to attenuate contactless communication (e.g., ISO 14443, ISO 15693) between the smartcard and an external reader. The contact pads themselves may also tend to attenuate contactless communication. Hence, metallized smartcards may often function in a contact mode (e.g., ISO 7816) only.

Foil composite cards and metal cards may be disclosed in . . .
  US 20090169776 (2009 Jul. 2; Herslow)
  US 20110189620 (2011 Aug. 4; Herslow)
  Shielding layers and the like may be disclosed in . . .
  U.S. Pat. No. 8,261,997 (2012 Sep. 11; Gebhart/NXP)
  EP1854222 (NXP)
  EP 02063489 (Tyco)
  U.S. Ser. No. 13/744,686 filed 18 Jan. 2013 (now US 20130126622, 23 May 2013) discloses offsetting shielding and enhancing coupling in metallized smart cards. As disclosed therein (FIG. 4A), a conductive "compensation loop" CL may be disposed behind the booster antenna BA, extending around the periphery of the card body CB. The compensation loop CL may be an open loop having two free ends, and a gap ("gap") therebetween. The compensation loop CL may be made of copper cladding.

Some other patents of interest may include . . .
  U.S. Pat. No. 8,393,547 issued 2013 Mar. 12 (Kiekhaefer et al.; Perfect Plastic)
  US 20140166762 published 2014 Jun. 19 (Herslow)
  Some terms used herein may include:
  "skin depth" relates to the "skin effect" which is the tendency of an alternating electric current (AC) to become distributed within a conductor such that the current density is largest near the surface of the conductor. A "skin depth" or minimum thickness for conducting current may be defined, for a given material at a given frequency. For example, at 13.56 MHz, the skin depth for copper may be approximately 18 µm (17.7047 µm). For smartcards, 13.56 MHz is a frequency of interest.
  "transparency" refers to the ability of electromagnetic radiation to pass through a material. A threshold for non-transparency (or the ability to interact with RF) may be a fraction of the skin depth for the metal layer in question at a given frequency of interest. For example, the non-transparency threshold for copper at 13.56 MHz, may be one-tenth of the skin depth, or approximately 1.7 µm.

SUMMARY

It is a general object of the invention to provide improved techniques for improving coupling of smartcards with a contactless reader.

Some other objects may include relaxing performance constraints on the booster antenna (BA) of the smart card (SC), including the possibility of eliminating the booster antenna (BA) altogether.

The invention is generally directed to smartcard with coupling frame antenna and method of increasing activation distance of a transponder chip module.

According to some embodiments (examples) of the invention, generally a conductive coupling frame antenna (CFA), being a closed loop antenna circuit with a continuous metal track or path, having a rectangular geometry with a slit (S) and module opening (MO), disposed surrounding and overlapping the module antenna (MA) in a transponder chip module (TCM) or antenna module (AM). A transaction card with a continuous metal track or path having a slit (S) extending from a module opening (MO) to a periphery of the card body to function as a coupling frame antenna (CFA). The coupling frame antenna (CFA) may have a track or path width at the module opening equal in dimension to the width of the tracks forming the module antenna in the transponder chip module (TCM) or antenna module (AM). The metal track or path can be chemically etched aluminum, copper, a metalized surface or the like. At the periphery of the card body, the width of the metal track or path is no less than the skin depth of the metal at the frequency of interest. The metal can be replaced by a conductive medium such as silver paste, conductive ink, or the like requiring a greater track or path width to meet the conditions for proper current conduction. The coupling frame antenna (CFA) may resemble a one turn antenna as a closed loop circuit. The coupling frame antenna (CFA) may have multiple turns in a closed circuit design to capture the electromagnetic field, and concentrate a greater surface eddy current density around the area of the slit (S) and module opening (MO), to improve the inductive coupling and ultimately the power delivery to the chip. The coupling frame antenna (CFA) may commence in the center of the card body, extending to the right, forming a conductive path along the perimeter of the card body, forming a loop or module opening at an inner position on the left side of the card body, to surround and overlap a module antenna (MA) of a transponder chip module (TCM) or antenna module (AM), creating a slit by extending the track or path back to the periphery of the card body, and completing the coupling frame antenna structure by returning to the start position within the center of the card body.

A switch may be provided to disenable the antenna circuit by connecting its terminals across the slit (S) of the coupling frame antenna (CFA). A capacitor may be connected across the slit to boost performance. The transponder chip module (TCM) may comprise a laser-etched antenna structure (LES), a chemical-etched antenna structure (CES) and a non-perforated contact pad (CP) arrangement. A coupling frame antenna (CFA) may be incorporated onto the module tape (MT) for a transponder chip module (TCM).

According to some embodiments (examples) of the invention, generally, a smartcard (SC) may comprise an electrically-conductive track or path, referred to herein as a "coupling frame antenna" (CFA) disposed in the card body (CB) around at least two sides (or 180°) of a transponder chip module (TCM) so as to be in close proximity with the module antenna (MA) in the transponder chip module (TCM). The coupling frame antenna (CFA) may at least partially surround the transponder chip module (TCM), such as surrounding two sides (or 180°) or three sides (or 270°) of the transponder chip module (TCM), particularly the antenna structure (AS) of the transponder chip module (TCM). This includes "at least" two sides and "at least" three sides. The coupling frame (CF) may nearly completely surround the transponder chip module (TCM), such as all four sides (or 360°) thereof, minus a slit (S). The slit (S) may be very small, such as 50 µm. (Such a small (50 µm) slit (S) may correspond to a fraction of a percent of the perimeter of the transponder chip module (TCM) or module opening (MO), or less than 1°.)

The module antenna (MA) may comprise an antenna structure (AS) which has been etched from a conductive layer or foil to have a conductor having two ends and arranged in a spiral pattern which has a number (such as 10-14) of turns (which may be referred to as "tracks"), separated by spaces. An end portion of an antenna structure (AS) may also comprise of a quarter, half or three quarter turn (fractions of turns).

A coupling frame antenna (CFA) surrounding all four sides (nearly 360°) of the transponder chip module (TCM) may be provided with a module opening (MO) for accommodating the transponder chip module (TCM), and may be provided with a slit (or slot, or cut-out, or gap) extending from the module opening (MO) to the perimeter of the coupling frame antenna (CFA). A switch (SW) may be incorporated into the card body to connect across the slit (S) of the coupling frame antenna (CFA) to short circuit its function of concentrating the distribution of surface eddy currents around the module opening.

Generally, the coupling frame antenna (CFA) may comprise a conductive layer, a metallized layer, a metal layer or overlapping metal layers, each layer at least partially surrounding the transponder chip module (TCM) and (in aggregate, in the case of two or more conductive layers) covering at least a substantial area of the card body (CB) for coupling with an external contactless reader.

The coupling frame antenna (CFA) may comprise one or more continuous tracks or paths of conductive material in the form of a perforated metal mesh or a wireframe metal mesh, or other continuous surface (including embedded ribbon conductor) to avoid electrostatic discharge (ESD) problems.

A coupling frame antenna (CFA) with a cut-out (module opening MO) to accept the transponder chip module (TCM) may be positioned in or on the card body to partially surround at close proximity to a laser-etched antenna structure (LES) or chemical-etched antenna structure (CES) of the transponder chip module (TCM).

The coupling frame antennas disclosed herein may be formed from tracks or paths of various metals (such as copper, aluminum (aluminium), brass, titanium, tungsten, stainless steel, silver, graphene, silver nanowires, conductive carbon ink), and may be in the form of ribbon cable, or the like, which could be hot stamped into a track or path of the card.

The transponder chip module (TCM) may comprise an RFID (radio frequency identification) chip or chip module (either of which may be referred to as "CM") and an etched (typically planar) antenna structure formed as a flat rectangular spiral having a number (such as 10-14) of conductive tracks separated by spaces. Using laser etching, the spaces between adjacent tracks can be less than 100 µm, less than 75 µm, less than 50 µm and less than 25 µm. The tracks may typically have a width of 100 µm. Laser-etching an antenna structure or structures underneath and surrounding a chip (CM) mounted on a module tape (MT) may improve the overall electrical parameters of the antenna.

A coupling frame antenna (CFA), at least partially surrounding and overlapping a transponder chip module (TCM) and residing substantially on the same plane as the laser-etched antenna structure (LES) or chemical-etched antenna structure (CES) in a card body, document or tag, and leaving at least one space or gap such as a cut-out, slit or slot in the coupling frame antenna (CFA), may further increase the amplitude of the resonance curve of the transponder chip module (TCM) with minimal frequency shift when interrogated by a reader. The activation distance of a transponder chip module (TCM) with a coupling frame antenna (CFA) may be substantially increased by at least a factor of 1.5, as opposed to the performance of a transponder chip module (TCM) without a coupling frame antenna (CFA). Activation distances of at least 2 cm, including up to 3 cm and up to 4 cm may be achieved using a transponder chip module (TCM) having a laser-etched antenna structure (LES) or chemical-etched antenna structure (CES) in conjunction with a coupling frame antenna (CFA) in (or comprising most of) the card body (CB).

A coupling frame antenna (CFA) may be used in conjunction with a holographic metal foil (refer to as holofoil), if the holofoil is transparent to high frequency electromagnetic waves and does not impair or influence the performance of a transponder chip module. The TCM may be implanted in a metal foil card because the thickness of the metal is significantly lower than the skin depth of the metal at a frequency of interest, such as 13.56 MHz, or more generally 10-30 MHz.

An LED may be connected across the slit, gap or contour in a coupling frame antenna to indicate a financial transaction.

The coupling frame antenna (CFA) may be a continuous one turn conductor being a closed loop circuit (having no start or end) with a resonance frequency in the ultrahigh frequency range such as in the bandwidth of 2-5 GHz. The coupling frame antenna (CFA) may broken at some point along its path to facilitate connection of a device such as an LED or capacitor. Alternatively a device may be connected in parallel across part of the CFA where winding(s), or part thereof, run parallel or in sufficient proximity to each other.

The width of the one turn antenna may be wider around the area where the module antenna is overlapping the conductive track of the coupling frame antenna. The surface eddy current may flow along the outer perimeter edge of the coupling frame antenna, while in the area of the slit, slot, gap or contour, the current may flow around the inner perimeter where the module antenna overlaps the coupling frame antenna.

The area where the transponder resides in a smartcard is prescribed by an ISO standard.

The invention relates broadly to RFID transponders which are able to transmit data to and receive data from an external reader. Such transponders may generally fall into two categories—"active" and "passive". Active transponders have an internal power source, such as a battery. Passive transponders are powered by (harvest power from) the external reader. Due to the lack of their own power source, several factors may influence the successful operation of a passive transponder, some of which are addressed herein. For example, the distance at which a passive transponder may be activated (powered up by) and communicate reliably (read/write) with the external reader may be very limited. Consequently, smart cards (SC) comprising passive transponders have typically required booster antennas (BA) in the card body (CB). In the main hereinafter, passive RFID transponders comprising (passive) transponder chip modules (TCM) are discussed, and unless otherwise specified, all embodiments are directed to passive RFID transponders and transponder chip modules (TCM). Passive RFID transponders and transponder chip modules (TCM) disposed in smart cards (SC) (including metal foil smart cards and plastic metal hybrid smart cards) and capable of operating in a contactless mode without requiring a conventional booster antenna (BA) (being replaced by a coupling frame antenna (CFA) are disclosed herein.

According to the invention, generally, a conductive coupling frame antenna (CFA) may have a continuous track or path, may form a complete loop, may be disposed surrounding and closely adjacent a transponder chip module (TCM), and may be substantially coplanar and overlapping with an antenna structure (AS, LES, CES) in the transponder chip module (TCM). A coupling frame antenna (CFA) may have multiple tracks or paths as a continuous track or path. A coupling frame antenna (CFA) may be formed on one or both sides of an inlay substrate. The coupling frame antenna (CFA) may be a closed circuit on one side of the inlay substrate, while the antenna on the opposite side of the substrate may be an open circuit having a start and end position. The transponder chip module (TCM) may comprise a laser-etched antenna structure (LES) or chemical-etched antenna structure (CES) and a non-perforated contact pad (CP) arrangement.

According to the invention, the coupling frame antenna (CFA) may extend over a periphery area of the smartcard. The coupling frame antenna (CFA) may commence at the center of the card body, at so-called center of technology (COT), in order to operate in a similar manner as a conventional booster antenna, and meet the test conditions defined by EMV standards.

According to the invention, generally, a smartcard (SC) has a card body (CB) and a conductive coupling frame antenna (CFA) extending as a closed loop circuit around a periphery of the card body, and also extending inwardly so that two portions of the coupling frame antenna are closely adjacent each other, with a gap therebetween. The gap may extend from a periphery of the card body to a position corresponding with a module antenna (MA) of a transponder chip module (TCM) disposed in the card body, and may function like a slit (S) in a coupling frame (CF). A portion of the coupling frame antenna may be arranged to surround an area which is the ISO position of the transponder chip module in the card body. A coupling frame antenna (CFA) may be incorporated onto a module tape (MT) for a transponder chip module (TCM).

According to some embodiments of the invention, a smartcard may comprise a card body (CB), wherein a given area of the card body is designated for receiving a transponder chip module (TCM) having a module antenna (MA); and may be characterized by: a coupling frame antenna (CFA) comprising conductive track routed around a perimeter of the card body, and further routed toward the interior of the card body to the area designated for receiving the transponder chip module, resulting in two portions of the coupling frame antenna (CFA) being closely adjacent one another with a gap (S, 203, 303) therebetween, the gap extending from a peripheral edge of the card body to the area of the card body designated for receiving the transponder chip module (TCM). A portion of the conductive track may surround the (ISO) area designated for receiving the transponder chip module. A portion of the conductive track may form a loop around the area of the card body designated for receiving a transponder chip module (TCM). A transponder chip module may be disposed in the loop, and a portion of the coupling frame antenna may overlap a portion of the module antenna (MA) in the transponder chip module. The gap of the coupling frame antenna may overlap a overlap a portion of the module antenna (MA) in the transponder chip module. The coupling frame antenna (CFA) may comprise a single-turn, closed-loop circuit.

The coupling frame antenna may begin in the center of the card body and extend over the peripheral area of the smartcard. The conductive track may have a width greater than its skin depth at a frequency of interest. The conductive track may comprise multiple tracks.

The coupling frame antenna may be formed on one side of an inlay substrate. A second coupling frame antenna may be formed on another side of the inlay substrate. One of the coupling frame antennas may be formed as a closed circuit, and the other of the coupling frame antennas may be formed as an open circuit, having a start and an end position.

In their various embodiments, the invention(s) described herein may relate to industrial and commercial industries, such RFID applications, payment smartcards, loyalty cards, gift cards, hotel keycards, identity cards, access control cards, wearable devices the like.

Other objects, features and advantages of the invention(s) disclosed herein may become apparent in light of the following illustrations and descriptions thereof.

Coupling Frame Background

Radio frequency identification (RFID) enabled smartcards which communicate in contactless mode with a reader or point-of-sale (POS) terminal have been around for over 20 years. These passive devices operating at the 13.56 MHz ISM frequency are energized by the electromagnetic field propagated by a POS terminal. The same RFID technology also applies in national identity cards and electronic passports. More recently, financial cards (prepaid, debit and credit cards) have both a contact and contactless interface, so-called dual interface (DIF) chip cards, with the contactless interface being used for micro-payment transactions.

A DIF smartcard has a transponder chip module implanted and an in-card booster antenna embedded into the card body, with no physical electrical contact between the chip module and the antenna. The transponder chip module has a 6 or 8 contact pad array on its obverse side and a miniature antenna (micro-coil) routed around an RFID chip on its reverse side. The operation between the transponder chip module and its companion in-card booster antenna is referred to as "inductive coupling".

Based on the teachings of U.S. Pat. No. 9,475,086[1], titled "Smartcard with Coupling Frame and Method of Increasing Activation Distance of a Transponder Chip Module" by Finn et al., an academic paper emanating from a research program was published in May 2016 in conjunction with the 2016 IEEE International Conference on RFID and titled "Use of slits of defined width in metal layers within ID-1 cards, as reactive couplers for near-field passive RFID at 13.56 MHz".

The manuscript from Ackland et al.[2] elucidates the technique of reactive (i.e. inductive and capacitive) coupling using a slit or slot of defined width and module opening (rectangular cut-out) in a metal foil to concentrate surface eddy current density around a transponder chip module.

When a metal foil coupling frame with slit is exposed to an electromagnetic field generated by a reader antenna, the induced circulating loops of eddy currents do not work against the field that created them, but rather may enhance the magnetic field around the area of the slit and thus the surface eddy currents do not react back on the source of the changing magnetic field.

High frequency structural simulator (HFSS) models on coupling frames with cut-out/slits and overlapping transponder chip modules provided finite element calculations and measurements. 2D inductive magnetic field profiles showed that the field concentration runs along the coupling frame perimeter in addition to the position of the cut-out/slit. Inductance is created due to the flow of the surface eddy currents around the area of the cut-out/slit, coupling in close proximity with the overlapping antenna structure of the transponder chip module. This system can be compared with an air coupled transformer, with a transformer ratio close to 55:1 being achieved. The profiles proved that the field was evidently enhanced in magnitude when the transponder chip module was combined with the coupling frame. A dominant control parameter of the coupling frame in combination with the transponder chip module was the front-end capacitance of the module's CMOS chip. The underlying physical mechanism is reactive coupling between the cut-out/slit and transponder chip module.[2]

The technique replaces the complicated in-card booster antenna for contactless communication with an inexpensive metal foil acting as the coupling frame. This RFID slit technology could also fundamentally change the design, functionality and operation of wearable devices for payment applications, as described in US 20160110639[3], titled "Passive Smart Cards, Metals Cards, Payment Objects and Smart Jewelry".

It may be noted that the input capacitance of dual interface semiconductor chips have increased significantly in recent times (from 17 pf to 69 pF, and to more than 100 pF) reducing the need to have a complex booster antenna structure for inductive coupling in a dual interface smartcard.

Some Prior Art

Qing et al.[4] demonstrated that metal plates in close proximity to a reader antenna operating at 13.56 MHz shifts up the resonance frequency of the antenna and weakens its field intensity. They found that the frequency shift and reduction in the field intensity are caused by the blockage of the magnetic flux through the loop antenna of the reader and the induction of eddy currents on the metal plate.

Chen et al.[5] report a novel way of reducing the effects of shielding from a metal surface in close proximity to an RFID tag. They propose a metallic RFID tag comprising of a slit in a metal plate and a window shaped slot to accept a small loop antenna. The antenna is designed for a Texas Instrument ultra high frequency (UHF) chip, whose input impedance is about (10.7-j62.8) Ω at 925 MHz. The small loop antenna inductively couples the energy to the metal with the corresponding slit and opening. The coupling strength is mainly controlled by the distance between the window slot and the loop antenna.

U.S. Pat. No. 8,608,082[6] (2013 Dec. 17, LeGarrec et al., '082) describes a method for amplifying the gain of an antenna in a transponder SIM device using a planar metal layer with a slit surrounding the periphery of the device; the metal layer does not overlap the antenna structure of the transponder, nor does it consider such an overlap as being an enhancing factor: "In conformity with an embodiment of the invention, the element extends around the antenna outside of an area defined by the projection of the antenna along a direction substantially orthogonal to the antenna surface. Thus, the antenna and the ring must not extend facing one another so as not to mask the magnetic field flux through the antenna surface. In other words, the element extends outside the outer perimeter of the antenna in a plane parallel to that containing the antenna or part of the antenna, or possibly in the same plane. However, when the element extends within the same plane as the antenna or part of the antenna, a minimum spacing is provided between the element and the antenna to ensure electrical isolation."

Mukherjee[7] explains how a metal surface in the vicinity of an air coupled reader-transponder system significantly degrades the performance. The electromagnetic field generated by the reader induces eddy currents on the surface of the metal, creating a magnetic field in opposition to the original field reducing the magnetic flux, and therefore inductance. Furthermore, reduction of the effective magnetic field reduces the power delivery to the chip.

The prior art may not consider the importance of the overlap of the coupling frame or coupling frame antenna with the module antenna of the transponder chip module, and more specifically the degree of overlap to achieve a contactless smartcard which is compliant with the EMVCo (Europay MasterCard Visa) contactless specification for payment systems. It is not just a question of transponder activation distance, but having optimum read/write performance with respect to responsiveness, timing, quality factor, load modulation and data communication at off-resonance side-lobe frequencies under different conditions of field intensity and without the presence of read holes or data clipping.

REFERENCES

[1] Finn, D., Lotya, M. and Molloy, D. (2016). "Smartcard with coupling frame and method of increasing activation distance of a transponder chip module", U.S. Pat. No. 9,475,086.
[2] Ackland, K., Lotya, M., Finn, D. J. and Stamenov, P. (2016). "Use of slits of defined width in metal layers within ID-1 cards, as reactive couplers for near-field passive RFID at 13.56 MHz", 2016 IEEE International Conference on RFID (RFID), Orlando, Fla., pp. 1-4.
[3] Finn, D., Lotya, M. and Molloy, D. (2016). "Passive Smart Cards, Metal Cards, Payment Objects and Smart Jewelry", U.S. Patent Application 2016/0110639.
[4] Qing, X. and Chen, Z. N. (2007). "Proximity Effects of Metallic Environments on High Frequency RFID Reader Antenna: Study and Applications", IEEE Transactions on Antennas and Propagation, Vol. 55 (11): pp. 3105-3111.
[5] Chen, S. L., Kuo, S. K. and Lin C. T. (2009). "A metallic RFID tag design for steel-bar and wire-rod management application in the steel industry", Progress in Electromagnetics Research, PIER Vol. 91: pp. 195-212.
[6] Le Garrec, L., Duval, A. and Launay, F. (2013). "Microcircuit device including means for amplifying the gain of an antenna", U.S. Pat. No. 8,608,082.
[7] Mukherjee, S. (2014). "Mitigation of proximity to metal for magnetically coupled transponders by use of resonant loops", 2014 IEEE International Conference on RFID (IEEE RFID), Orlando, Fla., pp. 8-14.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be exaggerated, others may be omitted, for illustrative clarity. Some figures may be in the form of diagrams.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein. Some elements may be referred to with letters ("CM", "CES", "CFA", "MT", "TCM", "LES", "CB", "MO", "S", and the like), rather than or in addition to numerals.

DETAILED DESCRIPTION

Figure 1:
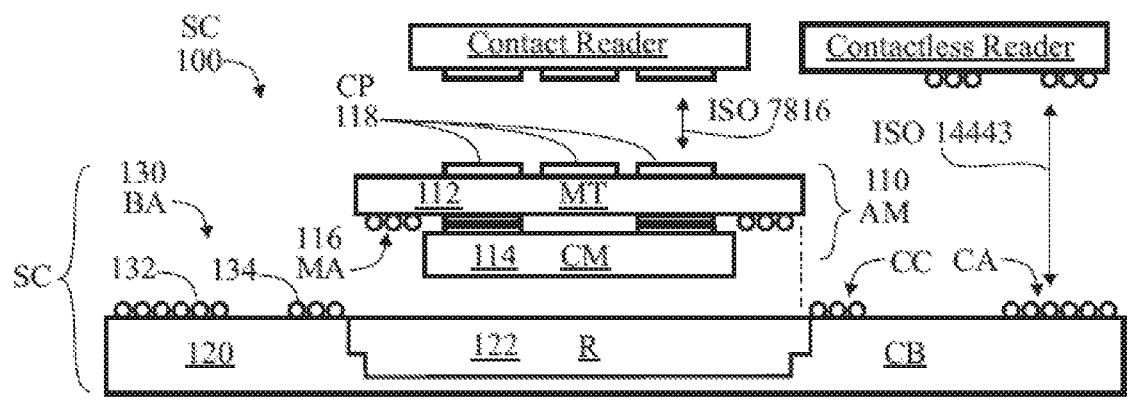
FIG. 1 is a diagram, in cross-section, of a conventional dual-interface smart card (SC) and readers.

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

In the main hereinafter, RFID cards, electronic tags and secure documents in the form of pure contactless cards, dual interface cards, phone tags, electronic passports, national identity cards and electronic driver licenses may be discussed as exemplary of various features and embodiments of the invention(s) disclosed herein. As will be evident, many features and embodiments may be applicable to (readily incorporated in) other forms of smart cards, such as EMV payment cards, metal composite cards, metal hybrid cards, metal foil cards, access control cards, hotel keycards and secure credential documents. As used herein, any one of the terms "transponder", "tag", "smart card", "data carrier", "wearable device" and the like, may be interpreted to refer to any other of the devices similar thereto which operate under ISO 14443 or similar RFID standard. The following standards are incorporated in their entirety by reference herein:

ISO/IEC 14443 (Identification cards—Contactless integrated circuit cards—Proximity cards) is an international standard that defines proximity cards used for identification, and the transmission protocols for communicating with it.

ISO/IEC 15693 is an ISO standard for vicinity cards, i.e. cards which can be read from a greater distance as compared to proximity cards.

ISO/IEC 7816 is an international standard related to electronic identification cards with contacts, especially smart cards.

EMV standards define the interaction at the physical, electrical, data and application levels between IC cards and IC card processing devices for financial transactions. There are standards based on ISO/IEC 7816 for contact cards, and standards based on ISO/IEC 14443 for contactless cards.

A typical data carrier described herein may comprise
(i) a transponder chip module (TCM) having an RFID chip (CM; or chip module) and a laser-etched antenna structure (AS, LES),
   it should be understood that the antenna structure (AS) may be laser-etched, or chemically-etched, and may be substantially planar having a number of tracks separated by spaces
(ii) a card body (CB) (which may be referred to simply as a "card"), and
(iii) a coupling frame antenna (CFA) disposed in or on the card body (CB) to enhance coupling between the transponder chip module (TCM) and the antenna of an external RFID "reader".

When "chip module" is referred to herein, it should be taken to include "chip", and vice versa, unless explicitly otherwise stated.

When "transponder chip module" (TCM) is referred to herein, it should be taken to include "antenna module" (AM), and vice versa, unless explicitly otherwise stated. The transponder chip module (TCM) may also be referred to as a "transponder IC module".

The transponder chip module (TCM) may comprise non-perforated isolated metal features such as contact pads on the face-up side of the module tape (MT) and a laser-etched antenna structure or structures (LES) on the face-down side of the module tape (MT). Certain components on either side of the module tape (MT) may be chemically etched. An antenna structure incorporated directly on the chip may inductively couple with the laser-etched antenna structure.

Throughout the various embodiments disclosed herein, unless specifically noted otherwise (in other words, unless excluded), the element referred to as "CM" will most appropriately be a bare integrated circuit (IC) die (or RFID chip), rather than a chip module (a die with a carrier). In contrast therewith, some figures present examples that are specifically "chip modules" having IC chips (such as a "CM") mounted and connected to substrates. A "chip module" (die and carrier) with a laser-etched antenna structure (LES) and connected thereto may be referred to as a transponder chip module (TCM).

When "inlay substrate" is referred to herein, it should be taken to include "card body", and vice versa, as well as any other substrate for a secure document, unless explicitly otherwise stated.

Component elements such as a switch, capacitor, inductor, resistor, an LED, or anti-shielding material such as ferrite can be included as an integral part of the transponder chip module or the coupling frame antenna.

The descriptions that follow are mostly in the context of dual interface (DI, DIF) smart cards, and relate mostly to the contactless operation thereof. Many of the teachings set forth herein may be applicable to pure contactless cards, tags, secure documents (e.g. electronic passports) and the like having only a contactless mode of operation. Generally, any dimensions set forth herein are approximate, and materials set forth herein are intended to be exemplary. Conventional abbreviations such as "cm" for centimeter", "mm" for millimeter, "µm" for micron, and "nm" for nanometer may be used.

FIG. 1 illustrates a smart card SC 100 in cross-section, along with a contact reader and a contactless reader. An antenna module (AM) or transponder chip module (TCM) 110 may comprise a module tape (MT) 112, an RFID chip (CM) 114 disposed on one side (face-down) of the module tape MT along with a module antenna (MA) 116 and contact pads (CP) 118 disposed on the other (face-up) side of the module tape MT for interfacing with an external contact reader. The card body (CB) 120 comprises a substrate which may have a recess (R) 122 extending into one side thereof for receiving the antenna module AM. (The recess R may be stepped—such as wider at the surface of the card body CB—to accommodate the profile of the antenna module AM.) The booster antenna BA 130 may comprise turns (or traces) of wire (or other conductor) embedded in (or disposed on) the card body CB, and may comprise a number of components such as (i) a card antenna (CA) component 132 and (ii) a coupler coil (CC) component 134. It may be noted that, as a result of the recess R being stepped, a portion of the card body (CB) may extend under a portion of the antenna module AM, more particularly under the module antenna MA.

Holographic metal foils may be glued or laminated to both sides of the booster antenna BA inlay (card body CB). The holographic metal foils may not significantly attenuate the electromagnetic field, in other words the holographic metal foils may be largely transparent to the RF field. The holographic metal foils can be used to mask (visually hide) the presence of the booster antenna BA. In addition, the holographic metal foils when placed either side (above, below) of the booster antenna BA can generate capacitance which may help improve the communication performance of the smart card with the reader (FIG. 1).

Figure 2:
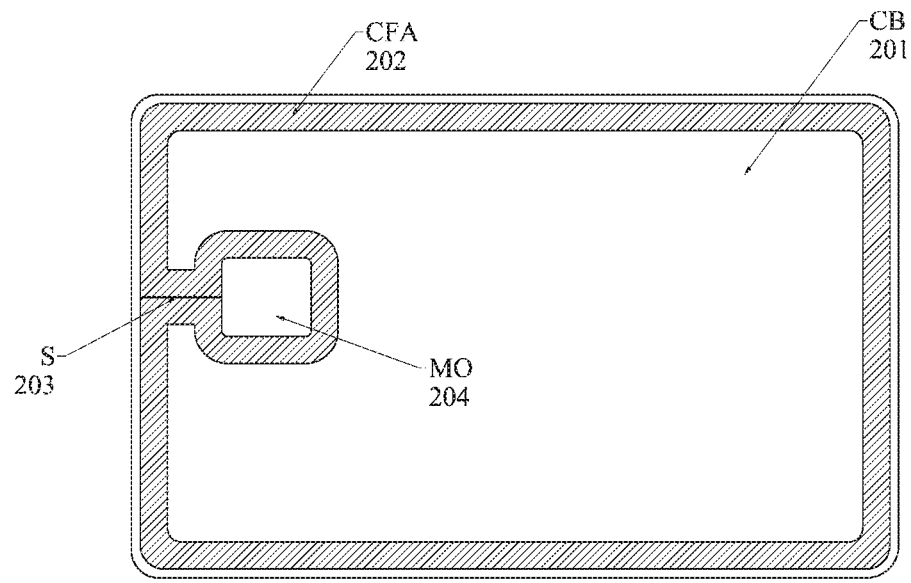
FIG. 2 is a diagram, of an exemplary coupling frame antenna with a track width of 3 mm

FIG. 2 is a diagram of an exemplary coupling frame antenna (CFA) with a track width of approximately 3 mm. The design shown illustrates a continuous closed loop single track coupling frame antenna (CFA) 202 placed within the perimeter defined by the card body (CB) 201. It is noted that the figure is illustrative of the shape and overall form of the coupling frame antenna (CFA) 202 and that the antenna may reside upon or between any of the layers that may make up a typical smartcard. The outer edges of the coupling frame antenna (CFA) 402 may extend to the periphery of the card body (CB) 201 or be offset from the edge of the smartcard by some distance to aid lamination or other assembly of the smartcard's additional layers. The path defined by the coupling frame antenna (CFA) 201 extends inwards towards and around the module opening (MO) 204. The length, width and track thickness of the coupling frame antenna (CFA) 202 in the vicinity of the module opening (MO) 204 may be set as to provide an optimum overlap with the module antenna (MA) of the transponder chip module (TCM).

The shape of the coupling frame antenna, as it extends inwardly from the left (as viewed) side of the card body to the module opening area, results in two side-by-side portions of the coupling frame antenna (CFA) being closely adjacent each other, with a gap therebetween. This gap may be comparable to the slit (S) in a conventional coupling frame (CF)

Generally, a "coupling frame" (CF) may comprise a metal layer, metal frame, metal plate or any electrically-conductive medium or surface with an electrical discontinuity such as in the form of a slit (S) or a non-conductive stripe extending from an outer edge of the layer to an inner position thereof, the coupling frame (CF) capable of being oriented so that the slit (S) overlaps (crosses-over) the module antenna (MA) of the transponder chip module (TCM), such as on at least one side thereof. The slit (S) may be straight, and may have a width and a length. In some embodiments, the slit (S) may extend to an opening (MO) for accepting the transponder chip module. In other embodiments, there may only be a slit, and no opening for the transponder chip module (TCM). Coupling frames of this type, typically a layer of metal with an opening for receiving a transponder chip module, and a slit extending from a periphery of the layer to the opening, wherein the slit overlaps at least a portion of the module antenna, may be found in U.S. Pat. Nos. 9,812,782, 9,390,364, 9,634,391, 9,798,968, and 9,475,086.

In contrast thereto, the coupling frame antenna (CFA) of the present invention may comprise a continuous conductive path or a track of wire or foil formed around the transponder chip module (TCM), such as by embedding wire or by etching a conductive path or track in the form of a one turn (or single-loop) antenna. The coupling frame may be planar or three dimensional (such as a curved surface). The coupling frame for inductive coupling with a reader may couple with either a passive or an active transponder chip module.

The path (or track) of the single-loop coupling frame antenna (CFA) may generally be around the periphery of the card body, but may extend to an inner position of the card body and double back on itself at selected areas of the card body, leaving a gap or void between the adjacent portions of the track. The space (void, gap) between closely-adjacent portions of the single-loop coupling frame may perform the function of a slit (S) in a conventional coupling frame—namely, overlap a portion of a module antenna in the transponder chip module—but it is distinctly different in construction. The coupling frame antenna (CFA) may wrap around the position (or module opening MO) for the transponder chip module (TCM).

Generally, the term "slit" will be applied to coupling frames (CF), and the term "space" will be applied to the corresponding feature of coupling frame antennas (CFA). However, in some instances, the term "slit" may be used to describe the space (void, gap) between closely-adjacent portions of the single-loop coupling frame antenna (CFA).

The overlap of the slit (or space) of either a coupling frame (CF) or a coupling frame antenna (CFA) with the module antenna (MA) may be less than 100%. In addition, the width and length of the slit (or space) can significantly affect the resonance frequency of the system and may be used as a tuning mechanism. As the width of slit (or space) changes, there is a resulting change in the overlap of the slit with the antenna.

Another distinction is important. When referring to a conventional overall coupling frame (CF) as being "continuous", it should be understood that the slit (S) represents both a mechanical and an electrical discontinuity in an otherwise continuous (electrically and mechanically) structure. The slit is a feature extending from an edge of the coupling frame (CF) to an interior position therof (typically, the module opening for the transponder chip module).

Most of the coupling frames described hereinbefore (such as in U.S. Pat. Nos. 9,812,782, 9,390,364, 9,634,391, 9,798, 968, and 9,475,086) may have a "continuous" surface, and may comprise a foil or sheet or layer of metal having a slit (an electrical discontinuity) for overlapping a module antenna and, in some cases having an appropriate opening (MO) for accommodating mounting the transponder chip module. Coupling frames may be printed, and may be made up of a wire grid or array (such as wire embedding wire (copper or silver) and making a physical connection through overlapping wires to create a coupling frame. The coupling frame could also be a metal mesh. A "discontinuous" coupling frame could be made from a solid metal layer, or from embedding wire in a suitable pattern in a substrate, both of which would be arranged to exhibit a slit/discontinuity.

The coupling frame antenna (CFA) described herein is easily distinguishable from previous coupling frames (CF) in that it does not have a slit extending from an outer edge thereof to an inner position thereof, and is generally a continuous structure. It is within the scope of the invention, however, that the coupling frame antenna (CFA) may be broken (made to be discontinuous) at some point along its length, in which case it may be considered to be an "open-loop" antenna rather than a "closed-loop" antenna.

When considering the coupling frame antenna (CFA), in this manner, a closed-loop single-turn continuous-tract antenna with a folded/contour shape resulting in narrow spaces between closeley-adjacent portioins of the track can function as a coupling frame, the space in the contoured antenna serving the purpose of the slit in a coupling frame, both the slit and space preferably overlapping at least a portion of the module antenna in the transponder chip module. A benefit of the contoured antenna having a space, rather than a coupling frame having a slit is that the slit in the coupling frame is a mechanical discontinuity that may slightly compromise the mechanical integrity of the card. The contoured antenna does not suffer from this disadvantage, because there is no mechanical discontinuity in its single-loop structure.

Where the coupling frame antenna (CFA) 202 doubles back on itself, there is a space (gap, void) 203 between two closely-adjacent portions of the CFA. (This space may sometimes be referred to as a "slit", as it performs a function similar to the slit of a CF, and may be labeled "S".) The gap (S) 203 as shown extends from the outer perimeter of the coupling frame antenna (CFA) 202 and intersects the module opening (MO) 204. A device, for example and LED or capacitor, may be connected across the gap (S) 203 or any other part of the coupling frame antenna (CFA) 202 in order to provide an additional function to the CFA 202 or to affect the resonance frequency of the device. Alternatively the coupling frame antenna (CFA) 202 may be broken at some point to permit connection of a device which in turn completes the circuit of the coupling frame antenna and gives an effectively continuous track.

Notably, the coupling frame antenna (CFA) is a continuous track with no start or end, in short a closed loop circuit having a contour or form which wraps around or surrounds the position for the placement of a transponder chip module, having a module antenna which overlaps the coupling frame antenna on one side, two sides, three sides or on all four sides. The gap, slot, cut out, slit or opening does not cause an electrical discontinuity in the coupling frame antenna. The transponder chip module inductively couples with the coupling frame antenna through its module antenna harvesting the surface current distribution.

Figure 3:
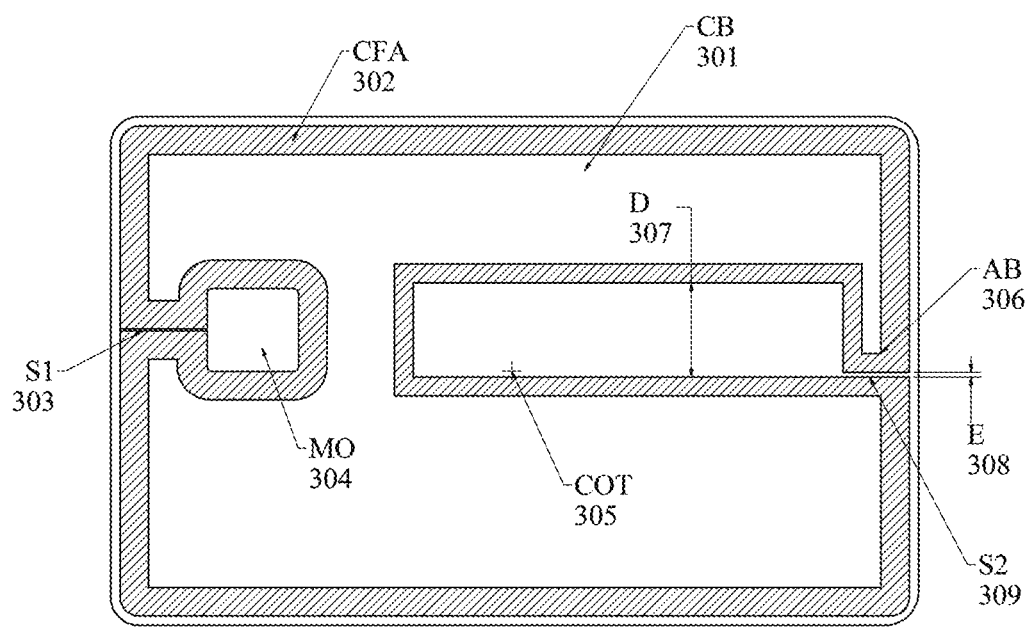
FIG. 3 is a diagram, of an exemplary coupling frame antenna with its start position in the center of the card body.

FIG. 3 is a diagram of an exemplary coupling frame antenna (CFA) with its start position in the center of the card body. As the coupling frame antenna (CFA) 302 is a continuous loop and thus has no well-defined start or end point it may be stated that the coupling frame antenna (CFA) 302 describes a path that extends inwards towards the center of the card body (CB) 301 from the right hand edge of the card body (CB) 301 as illustrated. A gap 303 (compare 203) is formed by two closely-adjacent portions of the CFA at the left (as viewed) portion of the card body (CB), and this gap 303 may function like a slit in a coupling frame (CF). Another gap (S) 309 may be formed by two closely-adjacent portions of the CFA at the right (as viewed) portion of the card body (CB).

In an aspect of this invention the coupling frame antenna (CFA) 302 shown extends around or near the geometric center of the card plane, which is coincident with the axis defined by EMV standards as the center of technology (COT) 305. The purpose of the extension of the coupling frame antenna (CFA) towards or around the center of technology (COT) 305 is to provide spatially uniform signal reception and communication with a reader antenna over and beyond the area defined by the card body (CB) 301 in order to meet required ISO and EMV smartcard standards. The distance (D) 307 may be any value so as to permit optimum radio frequency signal pickup by the coupling frame antenna (CFA) 302 at all regions of the card body (CB) 301. The antenna bend point (AB) 306 may also have varying shape or be omitted in the case where the inwards-extending tracks of the coupling frame antenna (CFA) 302 run parallel to each other; in this instance the distances (D) 307 and (E) 308 may be equal or similar. The distance (E) 308 may also be controlled so as to optimize the spatial radio frequency signal pickup characteristics of the coupling frame antenna (CFA) 302.

Regarding the gaps 203, 303, 309, as mentioned before, these features are distinctly different different than the slits (S) previously described, for example, in U.S. Pat. Nos. 9,798,968, 9,475,086, 9,812,782 and 9,390,364, as are formed by the contour (pattern) of the coupling frame antenna (CFA), rather than extending into the body of a coupling frame (CF) from an outer (or inner) edge thereof.

Figure 4:
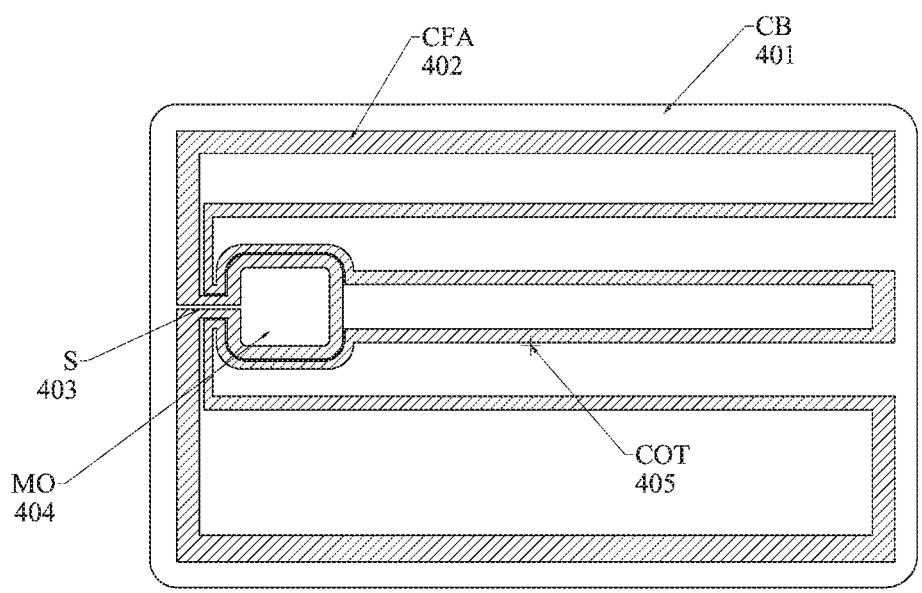
FIG. 4 is a diagram, of an exemplary coupling frame antenna with multiple track sections extending inwards toward the centre of the card.

FIG. 4 is a diagram of an exemplary coupling frame antenna (CFA) 401 that features multiple inward-extending tracks, as a variation of the design shown previously in FIG. 3. In this case the path defined by the coupling frame antenna (CFA) 401 extends inwards from the right edge of the card body (CB) 401, as shown, to closely loop around the module opening (MO) 404 before extending outwards towards the right edge of the card body (CB) 401. The path then runs inwards to closely loop around the module opening (MO) 404 again before extending outwards once more. The running of additional sections of the coupling frame antenna (CFA) 402 around the module opening (MO) 404 in this manner may be used to increase electromagnetic coupling to the module antenna (MA) of the transponder chip module (TCM). In this manner the coupling frame antenna (CFA) 402 forms a series of S-bends or "switchback" loops that enable a significant length of the coupling frame antenna (CFA) to pass through or around the center of technology (COT) 405. Through use of this layout the communication performance of the coupling frame antenna (CFA) 402 in conjunction with the transponder chip module (TCM) may be improved. It is noted that the number, pitch and density of "switchback" loops used is not constrained.

Coupling Frames (CF) in General

A metal surface or a conductive surface of suitable thickness and dimension acting as a coupling frame (CF) can replace (or obviate the need for) a booster antenna (BA) in a dual interface smartcard (SC). The coupling frame in a card body (CB), tag, document or the like, may operate on the principle of inductive capacitive coupling, concentrating surface eddy currents around the module antenna of a transponder chip module (TCM) which may have a laser-etched antenna structure (LES). Refer to U.S. Pat. No. 9,475,086.

It should be understood that the concepts associated with the coupling frame (and slotted metal layer in a card body), disclosed in U.S. Pat. No. 9,475,086 may provide performance benefits with other than laser-etched antenna structures (LES).

The performance of a laser-etched antenna structure (LES) in a transponder chip module (TCM) may be enhanced by surrounding the antenna structure (AS) with a metal frame (MF), or coupling frame (CF), in the card body (CB) of the smart card (SC).

According to some embodiments of the invention outlined in U.S. Pat. No. 9,475,086, generally, a dual interface smart card may comprise:
 a transponder chip module (TCM) having an antenna structure (AS);
 a card body (CB) comprising multiple layers; and
 at least one metal layer (ML) or metallized (metalized) layer forming an open loop coupling frame (CF) at least partially surrounding the transponder chip module (TCM).

The "open loop" in the metal layer may refer to the opening (MO) in the metal layer to accept the transponder chip module. The metal layer itself is a closed circuit (closed loop) with the surface eddy currents running on its outer perimeter edges and then concentrating their distribution at the inner edges of the opening and opening surrounding the module antenna of the transponder chip module.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), and claims, based on the disclosure(s) set forth herein.

What is claimed is:
1. Smartcard comprising:
 a card body (CB), wherein a given area of the card body is designated for receiving a transponder chip module (TCM) having a module antenna (MA);
 characterized by:
 a coupling frame antenna (CFA) comprising a conductive track routed around a perimeter of the card body, and further routed toward the interior of the card body to the area designated for receiving the transponder chip module, resulting in two portions of the coupling frame antenna (CFA) being closely adjacent one another with a gap (S, 203, 303) therebetween, the gap extending from a peripheral edge of the card body to the area of the card body designated for receiving the transponder chip module (TCM);
 wherein:
 the coupling frame antenna (CFA) comprises a single-turn, closed-loop circuit.
2. The smartcard of claim 1, wherein:
 a portion of the conductive track surrounds the area designated for receiving the transponder chip module.

3. The smartcard of claim 1, wherein:
the coupling frame antenna (CFA) forms a loop around the area of the card body designated for receiving a transponder chip module (TCM).

4. The smartcard of claim 3, wherein:
when the transponder chip module is disposed in the loop, a portion of the coupling frame antenna overlaps a portion of the module antenna (MA) in the transponder chip module.

5. The smartcard of claim 1, wherein:
the coupling frame antenna begins in the center of the card body and extends over the peripheral area of the smartcard.

6. The smartcard of claim 1, wherein:
the conductive track has a width greater than its skin depth at a frequency of interest.

7. Smartcard comprising:
a card body (CB), wherein a given area of the card body is designated for receiving a transponder chip module (TCM) having a module antenna (MA);
characterized by:
a coupling frame antenna (CFA) comprising a conductive track routed around a perimeter of the card body, and further routed toward the interior of the card body to the area designated for receiving the transponder chip module, resulting in two portions of the coupling frame antenna (CFA) being closely adjacent one another with a gap (S, 203, 303) therebetween, the gap extending from a peripheral edge of the card body to the area of the card body designated for receiving the transponder chip module (TCM);
wherein:
the conductive track comprises multiple tracks.

8. The smartcard of claim 7, wherein:
a portion of the conductive track surrounds the area designated for receiving the transponder chip module.

9. The smartcard of claim 7, wherein:
the coupling frame antenna (CFA) forms a loop around the area of the card body designated for receiving a transponder chip module (TCM).

10. The smartcard of claim 9, wherein:
when the transponder chip module is disposed in the loop, a portion of the coupling frame antenna overlaps a portion of the module antenna (MA) in the transponder chip module.

11. The smartcard of claim 7, wherein:
the coupling frame antenna begins in the center of the card body and extends over the peripheral area of the smartcard.

12. The smartcard of claim 7, wherein:
the conductive track has a width greater than its skin depth at a frequency of interest.

13. Smartcard comprising:
a card body (CB), wherein a given area of the card body is designated for receiving a transponder chip module (TCM) having a module antenna (MA);
characterized by:
a coupling frame antenna (CFA) comprising a conductive track routed around a perimeter of the card body, and further routed toward the interior of the card body to the area designated for receiving the transponder chip module, resulting in two portions of the coupling frame antenna (CFA) being closely adjacent one another with a gap (S, 203, 303) therebetween, the gap extending from a peripheral edge of the card body to the area of the card body designated for receiving the transponder chip module (TCM);
wherein:
the coupling frame antenna is formed on one side of an inlay substrate.

14. The smartcard of claim 13, wherein:
a second coupling frame antenna is formed on another side of the inlay substrate.

15. The smartcard of claim 14, wherein:
one of the coupling frame antennas is formed as a closed circuit; and
the other of the coupling frame antennas is formed as an open circuit, having a start and end position.

16. The smartcard of claim 13, wherein:
a portion of the conductive track surrounds the area designated for receiving the transponder chip module.

17. The smartcard of claim 13, wherein:
the coupling frame antenna (CFA) forms a loop around the area of the card body designated for receiving a transponder chip module (TCM).

18. The smartcard of claim 17, wherein:
when the transponder chip module is disposed in the loop, a portion of the coupling frame antenna overlaps a portion of the module antenna (MA) in the transponder chip module.

19. The smartcard of claim 13, wherein:
the coupling frame antenna begins in the center of the card body and extends over the peripheral area of the smartcard.

20. The smartcard of claim 13, wherein:
the conductive track has a width greater than its skin depth at a frequency of interest.

* * * * *